US012235860B2

(12) United States Patent
Rivera et al.

(10) Patent No.: US 12,235,860 B2
(45) Date of Patent: Feb. 25, 2025

(54) DATA ACQUISITION MANAGEMENT SYSTEM AND METHOD THEREOF

(71) Applicant: Thinaer, Inc., Richardson, TX (US)

(72) Inventors: Michael J. Rivera, Blue Bell, PA (US); Richard R. Hegedus, Dallas, TX (US); Taylor Veith, Port Saint Lucie, FL (US); Paul M. Kavanaugh, Addison, TX (US)

(73) Assignee: Thinaer, Inc., Richardson, TX (US)

( * ) Notice: Subject to any disclaimer, the term of this patent is extended or adjusted under 35 U.S.C. 154(b) by 0 days.

(21) Appl. No.: 17/951,678

(22) Filed: Sep. 23, 2022

(65) Prior Publication Data

US 2023/0098289 A1  Mar. 30, 2023

Related U.S. Application Data

(60) Provisional application No. 63/248,493, filed on Sep. 26, 2021.

(51) Int. Cl.
*G06F 16/00* (2019.01)
*G06F 16/25* (2019.01)
*G06F 9/54* (2006.01)

(52) U.S. Cl.
CPC ............ *G06F 16/252* (2019.01); *G06F 9/546* (2013.01)

(58) Field of Classification Search
CPC ............................... G06F 16/252; G06F 9/546
USPC ................................................... 707/600–899
See application file for complete search history.

(56) References Cited

U.S. PATENT DOCUMENTS

| 10,009,868 | B1 * | 6/2018 | Reyes | G06Q 30/0261 |
| 11,083,419 | B2 * | 8/2021 | Brasch | A61B 5/0077 |
| 2010/0176950 | A1 * | 7/2010 | Bartholf | G07F 9/026 |
| | | | | 340/572.1 |
| 2019/0326015 | A1 * | 10/2019 | Cannell | G16H 40/20 |
| 2021/0335488 | A1 * | 10/2021 | Higginson | H04B 17/27 |
| 2021/0343127 | A1 * | 11/2021 | Chan | G08B 21/22 |
| 2022/0373639 | A1 * | 11/2022 | Shaw | G01P 13/00 |

(Continued)

OTHER PUBLICATIONS

Charu C. Aggarwal et al., Outlier Ensembles—An Introduction, published 2017, Springer International Publishing, DOI 10.1007/978-3-319-54765-7 , pp. 217-218, 221-223, https://books.google.com/books?hl=en&lr=&id=UNmfDgAAQBAJ.

(Continued)

*Primary Examiner* — Michelle N Owyang
(74) *Attorney, Agent, or Firm* — Kaplan Breyer Schwarz, LLP

(57) ABSTRACT

A data acquisition management system comprises a plurality of sensors, each for acquiring sensor data based on respective physical or logical conditions; a plurality of beacons for acquiring the sensor data transmitted from the sensors; a processing engine comprising a trigger data file for storing conditions under which each of a plurality of trigger alerts occurs, wherein each of the trigger alerts includes a unique identifier, respectively, respective one or more thresholds which when crossed initiates the trigger alerts, and pointers that directly or indirectly reference the unique identifiers of the sensors that provide the sensor data that is used to determine if any of the trigger alerts occurs; and a trigger alert transmitter for transmitting each trigger alert to a designated one of a plurality of end terminals.

15 Claims, 12 Drawing Sheets

(56) References Cited

U.S. PATENT DOCUMENTS

2022/0386414 A1* 12/2022 Bush .................. G16Y 40/35
2023/0042066 A1* 2/2023 Liff .................. H04W 40/244

OTHER PUBLICATIONS

Taylor Veith et al., Unpublished Related Application entitled "Method and Apparatus for Rapid Location of Data Acquisition Devices", Feb. 23, 2023, 40 pp.

* cited by examiner

| Tag ID | x-Coord | y-Coord | Tag Type | Value 1 | Value 2 |
|--------|---------|---------|----------|---------|---------|
| 001 | 44 | 82 | 102 | X | X |
| 002 | 52 | 79 | 100 | | |
| 003 | 10 | 108 | 101 | | |
| 004 | 82 | 89 | 101 | | |
| ... | | | | | |
| 010 | 104 | 171 | 101 | | |
| 602 | 604 | 606 | 608 | 610 | 612 |

| Tag Type | Lower Limit | Upper Limit |
|---|---|---|
| 100 | 0 | 82 |
| 101 | 44 | 46 |
| 102 | X | X |
| ⋮ | | |
| 702 | 704 | 706 |

| | |
|---|---|
| Name | Freezer Temperature — 1102 |
| Description | Notify me when freezer is too warm |
| 1104 | |
| Severity | Moderate |
| Add Keywords | ⊕ — 1108   — 1106   — 1110 |
| Trigger Type | Ability |
| Condition | Temperature |
| 1112 | falls below — 1112a   or   rises above — 1112b |
| Duration | 10   Minutes — 1114 |
| Auto Resolve | 0   Minutes — 1116 |
| Asset Filter | Keywords   Refrigerator TV × |
| 1118 | |
| Contacts | paul.kavanaugh@thinaer.io |
| 1120 | paul.kavanaugh@thinaer.io   × |
| Subscription | ⊕ |
| 1122 | |

Submit

DATA ACQUISITION MANAGEMENT SYSTEM AND METHOD THEREOF

RELATED APPLICATIONS

This application claims the benefit of U.S. Provisional Patent Application No. 63/248,493, filed Sep. 26, 2021, the entire disclosure of which is incorporated herein by reference.

FIELD

The present invention relates to data acquisition management and more particularly to the identification and possible intervention with physical components in a system with fluctuating characteristics. In particular, a method and apparatus are described for receiving sensor data associated with physical characteristics or process status, processing that data based on databases in a way that detects potential abnormalities, and providing alerts to defined destinations for purposes of potential intervention.

BACKGROUND

In any observed system, a plurality of physical components perform various functions. One type of component affects physical characteristics of an environment, such as light, heat, cooling, humidity, etc. Another type of component is associated with a manufacturing process, and may include devices that provide mechanical force, transport raw ingredients, modify environmental factors as a product is being produced, etc. A third type of component may be related to a transportation system, and may include devices that propel or channel transport units between multiple locations. A fourth type of component may relate to a healthcare environment and may include devices that affect environmental attributes (temperature, humidity, etc.), devices that monitor patients (heart monitors, oxidation monitors, etc.), and devices associated with the performing of medical procedures (surgical tools, diagnostics tools, etc.). A fifth type of component may monitor process progress and provide data associated with how far a process has proceeded and/or whether or not process completion has occurred.

The physical devices situated in such systems are subject to operational changes. Some such changes may be deliberate, some such changes may occur in response to environmental factors, and some such changes may be undesirable. Examples of operational changes include: device defect, partial or complete device failure, repairing a defective part, adjusting control of a physical device, replacing, eliminating or adding a physical device, changing a process partially or completely, changing an environment.

When physical devices change in their operation, the output of the physical devices may change, and there may be a consequential result. For example, if a heating unit malfunctions, environmental temperature may subsequently change. In one scenario, a human being becomes aware of the temperature fluctuation because they "feel cold" and then the cause of the change will be investigated. In another situation, a sensor such as a temperature gauge may be consulted to determine the extent of temperature change. In either case, the simplicity of the problem may result in the identification of the problem at least at a very basic level ("the heater is not working") so that further diagnostics may occur.

In a commercial, industrial, or healthcare setting (for example), monitoring and subsequent interaction may be more sophisticated than a person simply becoming aware that something is "not right." In a hospital or a manufacturing facility, for example, various sensors may be active with sensor results provided to a monitoring station. When an audible or visible alarm is activated at the monitoring station (or a measurement is conveyed that may be indicative or a problematic situation), a designated person can note the alarm (and/or conveyed measurement) and provide instructions for taking or initiating corrective action. In a hospital's cardiac department, for example, a remote heart monitor can provide data that indicates a patient requires defibrillation. In a nuclear power plant, a remote temperature monitor can indicate that a nuclear reaction has become "runaway" and rods need to be inserted into the power plant's core.

SUMMARY

Disclosed herein is a data acquisition management system, comprising: a plurality of sensors, each of the sensors for acquiring sensor data based on respective physical or logical conditions; a plurality of beacons for acquiring the sensor data transmitted from the sensors; a database comprising a trigger data file for storing conditions under which each of a plurality of trigger alerts occurs, wherein each of the trigger alerts includes: at least one unique identifier of an associated one of the sensors; at least one threshold of the associated one of the sensors, which when crossed initiates the trigger alert; and at least one pointer that directly or indirectly references the unique identifier of the associated one of the sensors that provides the sensor data that is used to determine if the trigger alert occurs. The data acquisition management system further comprises a processing engine including at least one processor for analyzing the sensor data acquired by each of the sensors to determine if the at least one threshold of the sensor has been crossed; and a trigger alert transmitter for transmitting each trigger alert to a designated one of a plurality of end terminals when an associated one of the at least one thresholds is crossed.

In some embodiments, the sensor data from each of the sensors is acquired from respective sensor signals, and the processing engine includes a location processor for determining location or movement of at least one of the sensors based on measurements of at least one of the sensor signals.

In some embodiments, the measurements include at least one of signal strength measured at multiple beacons or signal strength measured at multiple times.

In some embodiments, one or more sensor keywords are associated with each of the sensors, one or more alert keywords are associated with each of the trigger alerts, and one or more the sensor keywords are associated with each of the trigger alerts.

In some embodiments, a respective duration is associated with each of the trigger alerts, and each of the trigger alerts are initiated when each respective one or more of the thresholds remains crossed for the respective duration.

In some embodiments, a respective resolve time is associated with each of the trigger alerts, wherein each of the trigger alerts is cancelled by the processing engine if resolved within the respective resolve time.

In some embodiments, the trigger data file further includes address identifiers associated with each designated end terminals, and each of the trigger alerts is transmitted by the trigger alert transmitter to each designated end terminal based on a respective one of the address identifiers to report the trigger alerts.

In some embodiments, transmitting the trigger alerts to each designated end terminal results in providing the trigger alerts to respective physical terminals, wherein the processing engine allows at least one of: cancelling one of the trigger alerts responsive to a cancel reply on one of the physical terminals; and modifying one of the thresholds for one of the trigger alerts responsive to a modify reply that is transmitted from one of physical terminals.

In some embodiments, the processing engine further includes a user interface for adding, modifying or deleting the trigger alerts.

In some embodiments, the processing engine is capable of delivering at least one of the trigger alerts based on the one or more thresholds being crossed and is also capable of delivering at least another of the trigger alerts based on the location or the movement.

In some embodiments, multiple occurrences of the sensor data from one or more of the sensors receives evaluation by the processing engine, and one or more of the multiple occurrences that crosses one of the thresholds is omitted from causing one of the trigger alerts based on the evaluation.

In some embodiments, at least one of the designated end terminals receives one or more of the alert keywords for delivering one of the trigger alerts associated with the one or more of the alert keywords to the one of the designated end terminals.

In some embodiments, at least one of the designated end terminals receives one or more of the sensor keywords for delivering one of the trigger alerts associated with the one or more of the sensor keywords to the one of the designated end terminals.

In some embodiments, more than one of the sensors providing sensor data that crosses more than one of the threshold results in transmitting one of the trigger alerts Further disclosed herein is a method for performing asset correction, comprising the steps of: acquiring sensor data from a plurality of sensors, the sensors each associated with a respective asset, the sensor data including tag identifiers for identifying each of the sensors, respectively; acquiring location data that provides location information associated with each of the sensors; identifying tag types for each of the sensors; for each of the sensors, determining whether the sensor values have crossed one or more thresholds; allowing editing of the one or more thresholds; statistically analyzing sensor data associated with a selected one or more of the sensors having a selected one of the tag types; identifying at least one of the sensors having sensor data most beyond the thresholds from all of the sensors with the selected one of the tag types; displaying location of the identified at least one of the sensors; and interacting with one of the assets associated with the identified at least one of the sensors, so that the one of the assets results in sensor data that does not cross the thresholds or is closer to not crossing the thresholds.

Further disclosed herein is method for acquiring sensor data and transmitting alerts, comprising: acquiring, with a plurality of sensors, sensor data based on respective physical or logical conditions; acquiring, with a plurality of beacons, the sensor data transmitted from the sensors; storing, in a trigger data file of a database, conditions under which each of a plurality of trigger alerts occurs, wherein each of the trigger alerts includes: at least one unique identifier of an associated one of the sensors that acquires the sensor data; at least one threshold of the associated one of the sensors that acquires the sensor data, which when crossed initiates the trigger alert; and at least one pointer that directly or indirectly references the unique identifier of the associated one of the sensors that acquires the sensor data, which is used to determine if the trigger alert occurs; analyzing, with a processing engine comprising at least one processor, the sensor data acquired by each of the sensors to determine if the at least one threshold of the sensor has been crossed; and transmitting, with a trigger alert transmitter, each trigger alert to a designated one of a plurality of end terminals when an associated one of the at least one thresholds is crossed.

BRIEF DESCRIPTION OF THE DRAWING

The disclosure is best understood from the following detailed description when read in conjunction with the accompanying drawing. It is emphasized that, according to common practice, the various features of the drawing are not necessarily to scale. On the contrary, the dimensions of the various features may be arbitrarily expanded or reduced for clarity. Like numerals denote like features throughout the specification and the drawing.

FIG. 6 illustrates a table for storing data associated with beacons according to an exemplary embodiment of the present invention.

FIG. 7 illustrates a further table for storing data associated with beacon types according to an exemplary embodiment of the present invention.

FIG. 11 illustrates an exemplary user interface for creating trigger alerts according to an exemplary embodiment of the present invention.

DETAILED DESCRIPTION

It should be understood that the phraseology and terminology used below for the purpose of description and should not be regarded as limiting. The use herein of the terms "comprising," "including," "having," "containing," and variations thereof are meant to encompass the structures and features recited thereafter and equivalents thereof as well as additional structures and features. Unless specified or limited otherwise, the terms "attached," "mounted," "affixed," "connected," "supported," "coupled," and variations thereof are used broadly and encompass both direct and indirect forms of the same. Further, "connected" and "coupled" are not restricted to physical or mechanical connections or couplings.

Many alarm systems that are in use in commercial or industrial environments are set up on an "interrupt" basis, meaning a plurality of alarms are monitored, and when the activation of one is noticed, corrective action is then taken. Such systems are set up with predetermined trigger values, and respective alarms are activated when those specific thresholds are crossed. A smoke alarm emits a piercing sound when an optical sensor detects smoke. A cardiac alarm displays an urgent warning on a screen (and also emits a warning sound) when a patient goes into cardiac arrest. While such systems are useful, they also have significant limitations. Modifying thresholds may be difficult or time consuming. Thresholds may need modification multiple times based on various criteria. An alert may be desirable based on the data delivered by multiple sensors. Alerts may be desirable based on acquisition of different types of data. Alerts may be properly ignored if undesirable conditions resolve. Alerts may require intervention, but the sheer number of sensors and/or alerts may render monitoring multiple sensors/alerts at once extremely difficult.

One or more of the above features may not be possible with a simple hardwired alarm. The difficulty may stem from the inability to monitor multiple sensors, multiple combinations of sensors, and/or constant (and/or constantly changing) alerts. The difficulty may stem from the inability to receive an alert and modify that alert based on human (or computer) intervention. Thus, a system is desirable with technical features that provide the flexibility to improve monitoring a complex commercial or industrial environment.

Figure 1:
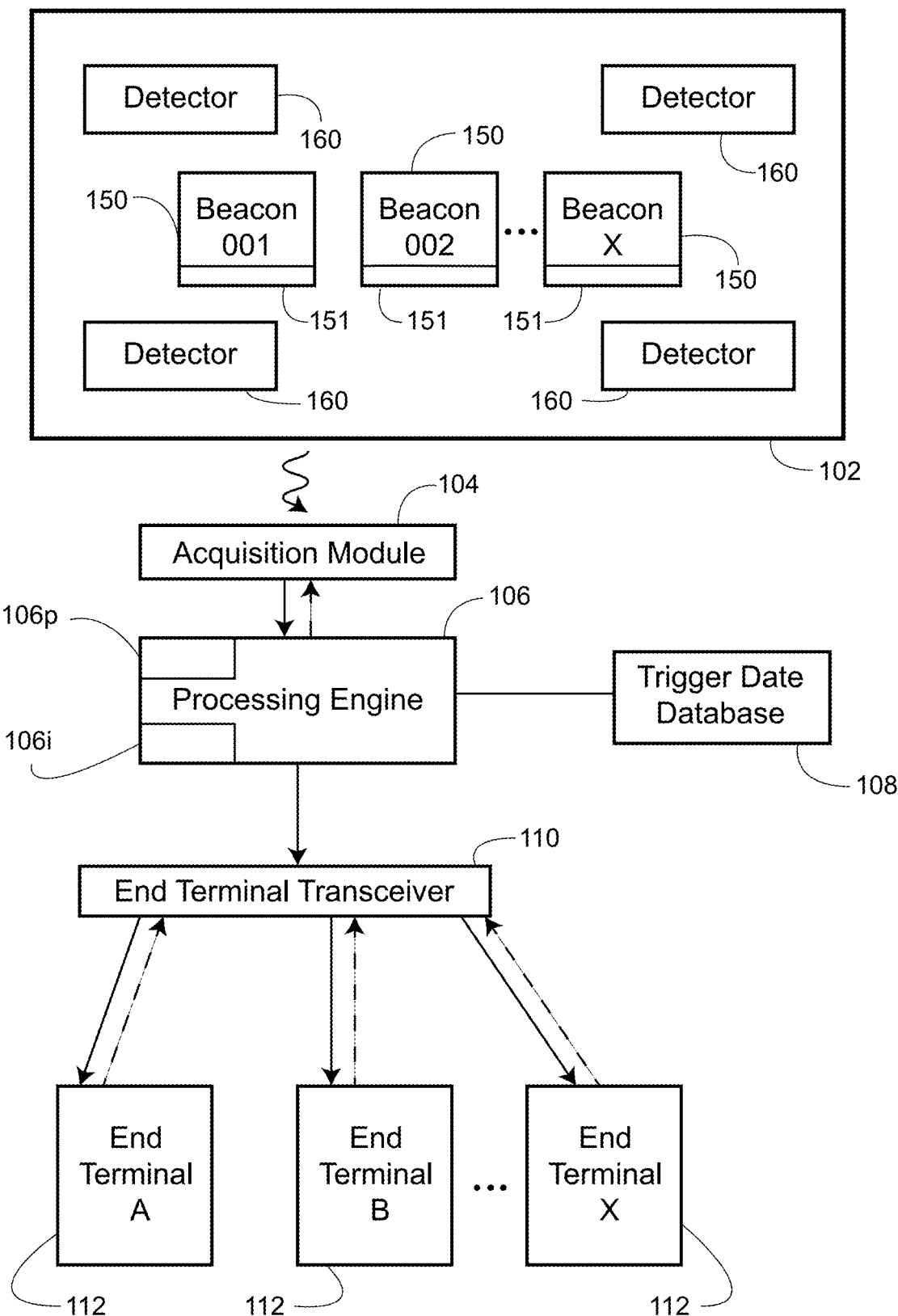
FIG. 1 is a block diagram that illustrates the operation of various components of an exemplary embodiment of a data acquisition management system according to the present invention.

FIG. 1 is a block diagram that illustrates the operation of various components of an exemplary embodiment of a data acquisition management system according to the present invention.

FIG. 1 illustrates environment 102 in which various aspects of environment 102 are monitored. Environment 102 can take on a variety of different configurations. In one example, environment 102 includes a plurality of distinct physical locations in which data is monitored. In another example, environment 102 may be one physical location in which data is monitored. In another example, environment 102 is a portion of a larger area (such as rooms within a building or a department) in which data is monitored.

Within environment 102 there are located one or more beacons 150. As an example, environment 102 may include numerous beacons 150 with respective identification values such as Beacon 001, Beacon 002 and Beacon X. Each beacon is associated with a respective sensor 151 that monitors physical and/or process characteristics. Sensor 151 includes environmental sensors (heat, light, humidity, etc.) characteristics of a particular machine or person (vibration, noise, speed, acceleration, physiological characteristics, etc.) process sensors (to what extent have specific processes been completed and/or a simple "yes/no" as to whether a process has been complete), or other types of sensors. Each sensor 151 is monitoring one or more aspects of an environment (and/or the items therein). Thus, various people, objects, or environments (not shown in FIG. 1) are monitored by each sensor 151. Each sensor 151 is in proximity to what needs to be monitored (otherwise identified as an asset—not shown) so that monitoring of each asset 102 can occur. Examples of assets are assets that affect environmental characteristics within environment 102. Examples of environmental characteristics include heat, air conditioning, humidity, atmospheric content (such as nitrogen, oxygen, carbon dioxide, etc.), light, etc. Assets thus may include air conditioners, gas regulators, pumps, etc. Another example of an asset is an asset that performs transportation such as a robot with independent locomotion, a drone, a conveyor belt, etc. Another example of an asset is an asset that performs an action desirable for manufacturing including manufacturing chamber pressure, manufacturing chamber humidity, manufacturing chamber temperature, ingredient dispensing, component placement, cutting, drilling, etc. For each beacon 150 associated with a sensor 151 (that measures the characteristics of one or more assets), each beacon 150 receives data from its associated sensor 151 and then transmits the received sensor data. The transmitted sensor data is then received by one or more detectors 160. Beacons 150 and detectors 160 may be part of one or more networks in order to facilitate transfer of sensor data. Sensor data may be transmitted from beacon(s) 150 to detector(s) 160 at regular intervals, at changing intervals, responsive to a signal received from detector 160, when a beacon is activated by a sensor 151 detecting a characteristic which results in subsequent activation of beacon 150, etc.

In one example, beacon 150 transmits temperature measured by sensor 151. The temperature may be temperature internal to an asset, the temperature of a manufacturing chamber in which an asset is affecting the environment of the manufacturing chamber, completion of a manufacturing step by one or more assets, completion of an interim manufacturing step by one or more assets, or some other aspect of an asset including vibration, injection, current, voltage, power, etc. In another example, sensor 151 is not associated with a specific asset (e.g. it measures temperature in a room) and beacon 150 transmits the temperature measured by sensor 151 within the room. In another example, sensor data that is transmitted by beacon 150 is used to identify the location of sensor 151 and/or location of an asset associated with sensor 151 (e.g. moving sensor 151 and its associated asset a greater distance than is permitted, moving sensor 151 and its associated asset at a greater speed than it is permitted, moving sensor 151 and its associated asset so that the associated asset is unacceptably close to another asset, something potentially harmful, a human being, etc.).

Beacon 150 transmits data that is received by detector 160. In one embodiment, a single detector 160 may be included for receiving data from beacon 150. In another example, a plurality of detectors 160 are used and beacon 150 communicates with one or more of multiple detectors 160. When beacon 150 communicates with a plurality of detectors 160, the plurality of detectors 160 may have one or more functions. In one example, beacon 150 communicates with one detector 160 that has the strongest signal with beacon 150. In another example, communication with beacon 150 may be based on physical proximity of beacon 150 and detector 160. In another example, beacon 150 may be within a specific area associated with detector 160. In another example, multiple detectors 160 acquire the signal from beacon 150 in order to identify the location of beacon 150.

Beacon 150 may communicate with detector 160 using a variety of different signaling protocols that are known to one of ordinary skill in the art including Wi-Fi, Bluetooth, cellular, NFC, optical signaling, audio, etc. Communication may occur using one or more protocols that are known to one of ordinary skill in the art including iBeacon, Eddystone, etc. In another example, the signal strength of signals received by multiple detectors 160 is triangulated in order to identify the location of module 150. Further examples of location identification may be used such as GPS, RFID, etc.

The data that is transmitted by each beacon 150 is received by one or more detectors 160. A subsequent transmission occurs from one or more detectors 160 to acquisition module 104. In one example, detector 160 simply passes along one or more sensor data values that it has received from beacon 150. In another example, detector 160 separately, alternately, or in addition transmits information associated with the signal that detector 160 receives from beacon 150. One such characteristic is signal strength. Another such characteristic is location data.

Acquisition module 104 comprises one or more interfaces. Each interface is specifically configured for capturing data from a particular type of sensor 151 associated with the interface. Acquisition module 104 preprocesses the sensor data it receives from each detector 160 and transmits the preprocessed data to processing engine 106. In one example, acquisition module 104 determines the location of each beacon from which it has received data. In another example, acquisition module 104 aggregates data (while in other embodiments, aggregation occurs elsewhere). Processing engine 106 uses the data received from acquisition module 104 in combination with various tables to take corrective action to assets and/or to provide further data. Exemplary tables (trigger data files) are included in trigger data database 108 and are further described below.

Trigger alerts, status of sensors, status of assets, status of processes or other data that is generated by processing engine 106 is forwarded to end terminal transceiver 110. End terminal transceiver may be provided with instructions (e.g. identification of an end terminal) to receive the output of processing engine 106. End terminal transceiver 110 then forwards processed data to end terminal 112. FIG. 1 illustrates that there may be multiple end terminals A, B, X, etc. End terminal 112 can be a user device (such as a phone, computer, etc.), a virtual terminal (such as an email address or text message address), a physical alarm (such as a siren, light, etc.), a protective device (an on/off switch for an asset), some type of storage (a database, cloud storage, etc.) or some other physical or virtual receiver that receives processed data.

Figure 2:
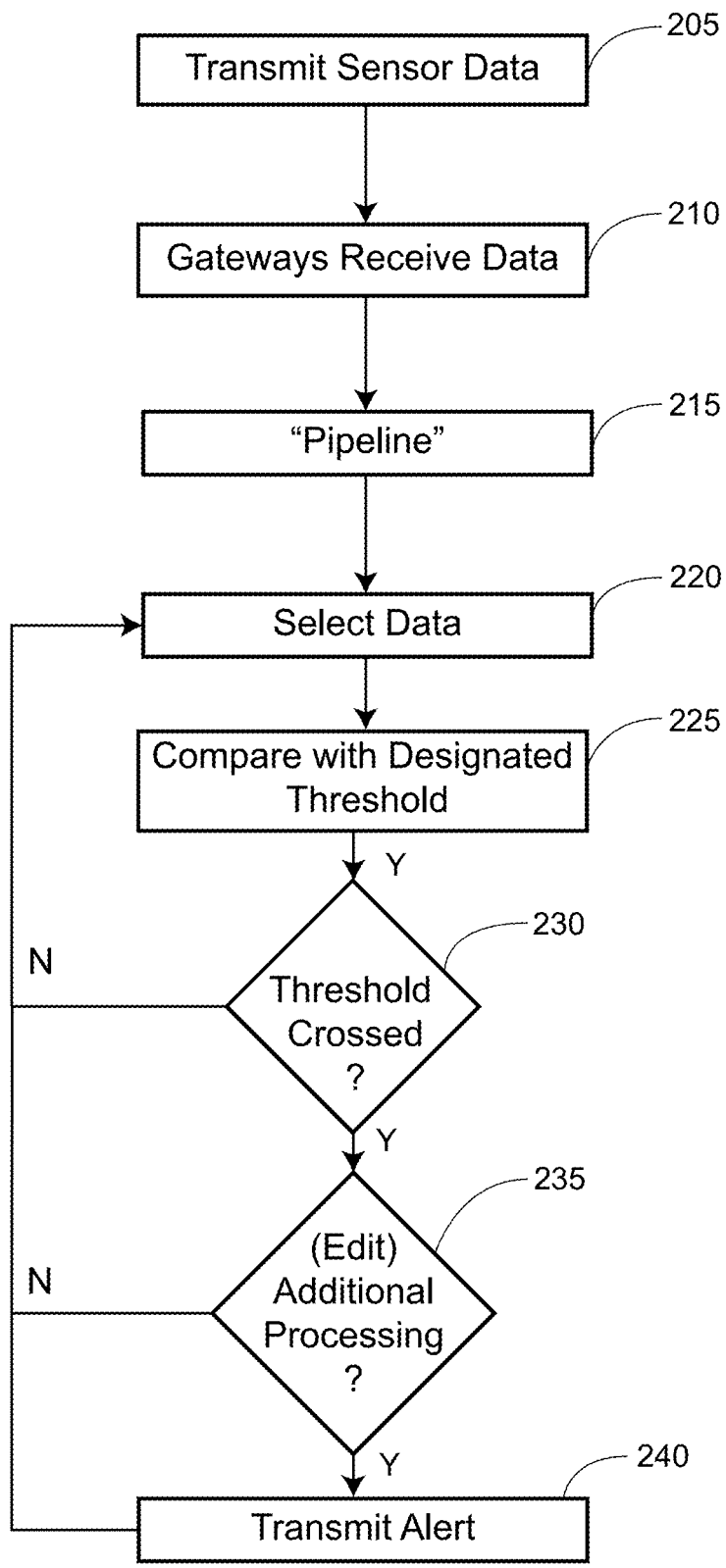
FIG. 2 is a flow chart diagram that illustrates steps related to transmission of a trigger alert according to an exemplary embodiment of the present invention.

FIG. 2 is a flow chart diagram that illustrates sensor data acquisition and alert transmission according to an exemplary embodiment of the present invention. At step 205, sensor 151 transmits its data to beacon 150, beacon 150 transmits the data received from sensor 151, and one or more detectors 160 ("gateways") receive sensor data transmitted by beacon 150. At step 210 detectors 160 forward data that they receive to acquisition module 104. At step 215 acquisition module 104, processing engine 106, or both preprocesses, i.e., pipelines the received data for further processing. Pipelining is the process of managing data that has been received at any time (sequentially or in parallel), and organizing the data in a manner so that it can be acted on by one or more processors, such as processing engine 106. The processing engine 106 stores the preprocessed data in trigger data database 108. Organizing data can have one or more aspects. In one aspect, data from many beacons 150 and/or detectors 160 is received and the data is organized in one of several ways. For example, sensor data from a common beacon may be collected together. In another embodiment, sensor data from a common type of beacon may be collected together.

In another embodiment, sensor data associated with a common trigger alert are collected together. In another embodiment, sensor data having a common characteristic is collected together as an aggregation until an aggregation quota has been reached. Exemplary aggregation quotas include a specific number of sensor data transmissions (or packets), sensor data transmissions over a certain time period, sensor data transmission of data that has exceeded a threshold over a time period, etc. Aggregations may be further processed using various forms of processing. Aggregations for example may be pipelined for serial processing. Aggregations may be stored in parallel for parallel processing (by actual or virtual parallel processors). Aggregations may be processed based on a priority scheme (with optional features for virtual concurrent processing and/or processing that is interrupted and resumed). At step 220, processing engine 106 (FIG. 1) selects received sensor data (e.g., signal strength readings between a sensor 151 of interest and a detector 160; temperature reading received from the sensor of interest; trigger threshold data for the sensor of interest, such as temperature thresholds for the sensor of interest) from trigger data database 108 (FIG. 1). At step 225, processing engine 106 compares the selected received sensor data with a threshold to determine if that threshold has been crossed. At step 230, if that threshold has not been crossed then processing proceeds back to step 220 and further sensor data for the sensor of interest or for a next sensor of interest is selected by processing engine 106 from trigger data database 108 and, at steps 225 and 230, evaluated by processing engine 106. Otherwise, at optional step 235 additional processing may occur. For example, sensor data may be determined to be an outlier and may be ignored. As another example, sensor data has crossed a threshold, but other conditions have not been met. Exemplary conditions include sensor data remaining beyond a threshold for a time period, sensor data remaining beyond a threshold for a predetermined number of sensor data transmissions, sensor data crossing a threshold by a percentage greater than 0 (i.e. threshold is 150, additional processing requires threshold to be crossed by additional 10%, determine if sensor data crossed threshold by 165), data from a different sensor indicating that the sensor data that crossed a threshold should be ignored, threshold modified based on how the threshold was crossed (e.g. only crossed for a certain amount of time within a total time period, other sensor data, etc.), threshold modified after being crossed by data from a different sensor. If the threshold is crossed at step 230 and/or step 235, processing reaches step 240. At step 240, processing engine 106 sends a trigger alert to end terminal transceiver 110 (FIG. 1). End terminal transceiver 110 then transmits the trigger alert to end terminal 112 (FIG. 1). If processing does not reach step 240 then processing returns to step 220 and further sensor data is evaluated to determine if a trigger alert should be transmitted.

Figure 3:
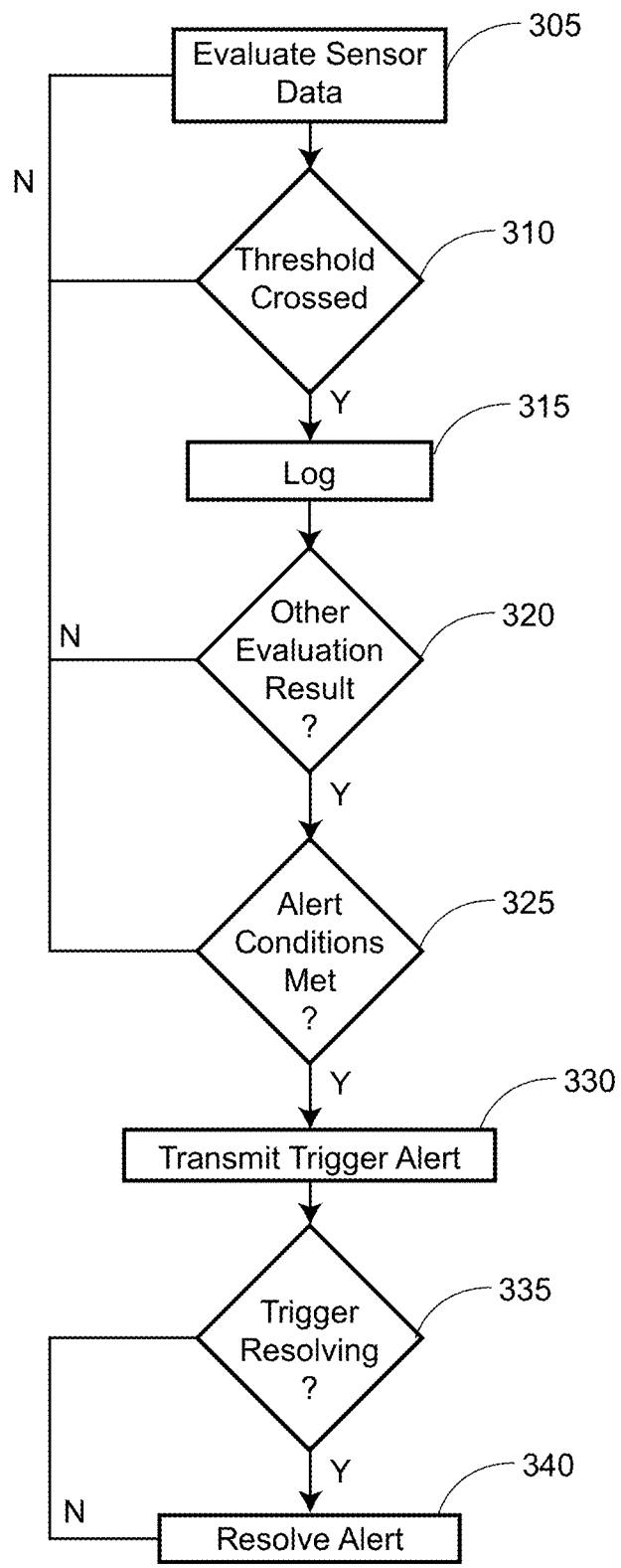
FIG. 3 is a flow chart diagram that illustrates further steps related to transmission of a trigger alert according to an exemplary embodiment of the present invention.

A further exemplary embodiment of the present invention is set forth in FIG. 3, in which there is a flow chart diagram illustrates sensor data processing according to a further exemplary embodiment of the present invention. This exemplary embodiment relates to steps that are taken with sensor data besides transmitting a trigger alert. At step 305 received sensor data is selected from trigger data database 108 for evaluation by processing engine 106 (FIG. 1). At step 310, a determination is made by processing engine 106 as to whether a threshold has been crossed. If the threshold has not been crossed, processing returns to step 305. If the sensor data indicates that the threshold has been crossed (and optionally subject to further processing as set forth in step 235 of FIG. 2 for example), then the crossing of the threshold is logged by processing engine 106 at step 315 in trigger data database 108. The logging may be associated with the specific sensor, with the asset associated with the sensor, with the asset type, with the sensor type, with keywords associated with the sensor type, with keywords associated with the asset type, etc. After logging, processing proceeds to step 320 where a determination is made as to another evaluation result. For example, the evaluation may be: 1) has enough data been received from sensor 151? 2) has enough data been received from beacon 150? 3) has enough data been received from a particular asset? 4) has data been received from a sensor, beacon and/or asset for a sufficient period of time? 5) has an ancillary event that should be reviewed in combination with the received asset, sensor and/or beacon data (singularly or in aggregate) affect whether a trigger alert should be transmitted? If it is determined in step 320, for example, that enough data has not been received from sensor 151, beacon 150, a particular asset, etc., processing returns to step 305 and more sensor data is selected for evaluation. If, however, it is determined in step 320 that enough data has been received from sensor 151, beacon 150, a particular asset, etc., processing proceeds to step 325 where processing engine 106 determines whether a trigger alert condition has been met. If at step 325, a processing engine 106 determines that a trigger alert condition has been met (e.g. at steps 310, 320, etc.) then processing proceeds to step 330 where processing engine 106 sends a trigger alert to end terminal transceiver 110 (FIG. 1). End terminal transceiver 110 then transmits the trigger alert to end terminal 112 (FIG. 1). Otherwise, processing returns to step 305 and more sensor data is selected for evaluation. At step 335, processing engine 106 determines whether the condition(s) that resulted in transmission of the trigger alert at step 330 are resolved. If condition(s) have not resolved, processing returns to step 330 for another determination. If the trigger alert conditions have resolved then at step 340, the trigger alert is indicated as having been resolved. There may be conditions associated with resolving a trigger alert. Examples include the amount of times sensor data exceeds a threshold within a time period, sensor data exceeds a threshold for a threshold number of times that sensor data from sensor 151 is evaluated, the severity with which the threshold was crossed, etc. In any case, various data may be reported to an end terminal 112. Examples include characteristics of the data (for what time period? how many times was it detected that a threshold was crossed? by how much was the threshold crossed?) and/or characteristics of the condition that caused transmission of the trigger alert (was the condition resolved within a time period?—was the condition resolved within a time period by a predetermined amount?—etc.).

Figure 4:
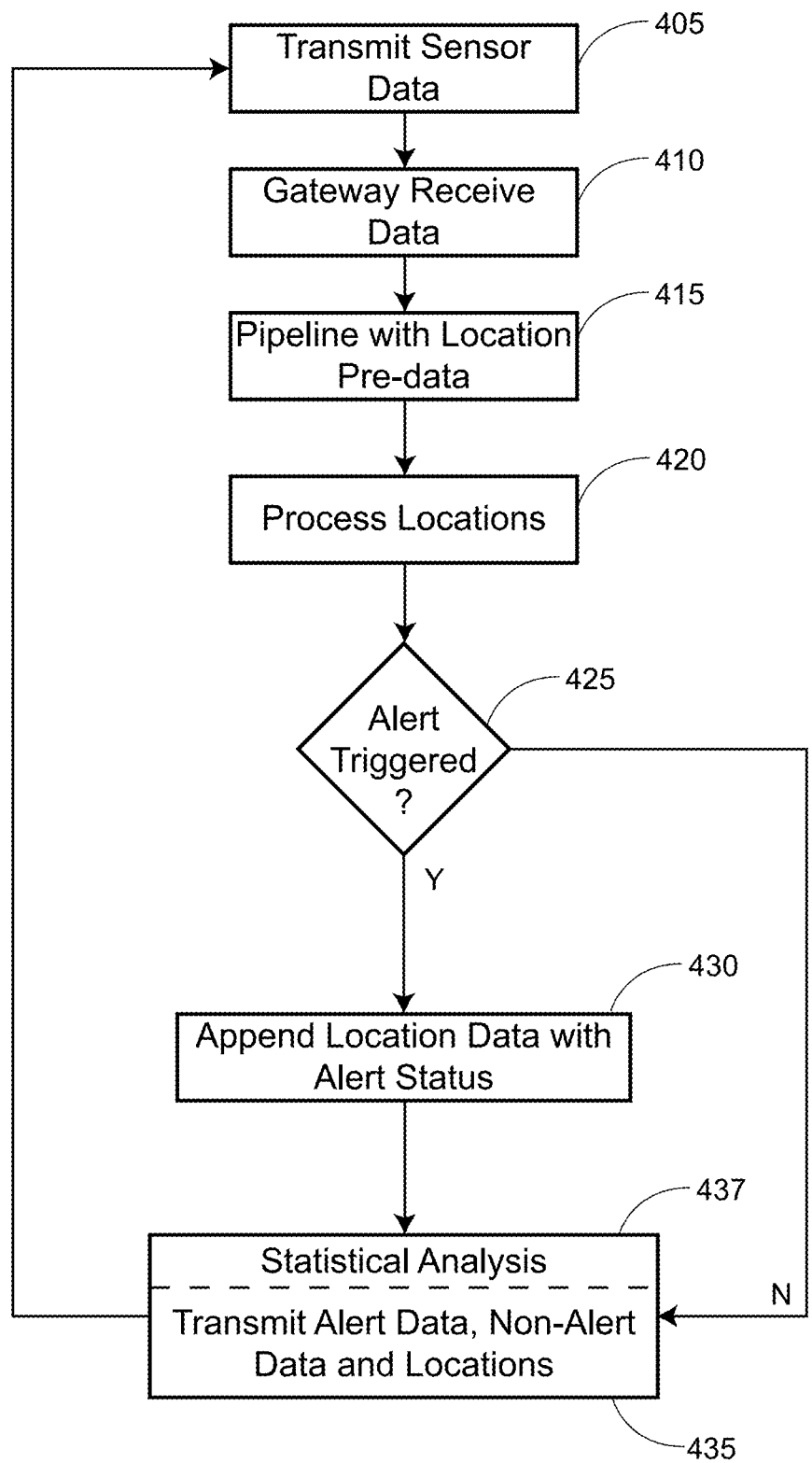
FIG. 4 is a flow chart diagram that illustrates further steps related to transmission of a trigger alert according to an exemplary embodiment of the present invention.

FIG. 4 illustrates a flow chart diagram according to a further exemplary embodiment of the present invention. This figure illustrates an exemplary embodiment of a method for identifying the location of a beacon. The location of the beacon 150 may provide the location of the asset and/or sensor associated therewith. At step 405, sensor data obtained by sensor 151 (FIG. 1) is transmitted by beacon 150 (FIG. 1). At step 410, the sensor data is received by detector (gateway) 160 (FIG. 1) from beacon 150. At step 415 acquisition module 104 (FIG. 1) collects (and/or aggregates/pipelines) sensor data with data that may be used for determining the location of beacon 150. Determining the location of beacon 150 may be accomplished in several different ways as understood by one skilled in the art. Examples of determining the location of beacon 150 include triangulation of the signal transmitted from beacon 150 with the detector(s) 160 that receive the signal. Signal strength at one or more detectors 160 may be used to determine beacon location. Further examples are provided below.

At step 420, the data received from each detector 160 (FIG. 1) is processed by processing engine 106 (e.g., location processor 106p of processing engine 106) (FIG. 1) to determine the location of a beacon 150 (FIG. 1). For example, the data received may be signal strength from beacon 150 at one or more detectors 160 that receive a signal from beacon 150 (wherein the greater the signal strength, the closer the beacon 150 is to the detector(s) 160). At step 425, processing engine 106 determines whether a trigger alert has been transmitted to end terminals 112 (FIG. 1) by end terminal transceiver 110 (FIG. 1). If it is determined that a trigger alert has not been transmitted, processing proceeds to steps 435 and 437 for statistical analysis. If it determined that a trigger alert has been transmitted, processing proceeds to step 430. At step 430, the location data of each beacon is stored in trigger data database 108 (FIG. 1), along with whether that beacon 150 (or sensor 151 (FIG. 1) or asset associated with that beacon 150) resulted in transmission of a trigger alert. At step 435, processing engine 106 may cause end terminal transceiver 110 to transmit various information to end terminal 112: a trigger alert is being transmitted; a trigger alert is not being transmitted; a threshold has been crossed but one or more other conditions have not been met to trigger transmission of a trigger alert; etc. At step 437, an optional statistical analysis may be performed. This optional statistical analysis may be performed to determine whether sensor data acquired from beacon 150 in one or more situations was an "outlier" i.e., an isolated aberration, and should be ignored.

In an exemplary embodiment of the present invention, each beacon 150 transmits a respective tag ID and/or tag type, which uniquely identifies that beacon. In one embodiment, a tag ID may be the equivalent of a respective serial number associated with each beacon 150 (FIG. 1). In one or more embodiments, a tag type may be associated with one or more assets or types of measurement. In one embodiment, the tag ID is transmitted by beacon 150, and the tag type (stored in the trigger data database 108 of FIG. 1) is retrieved by processing engine 106 (FIG. 1). In another exemplary embodiment, beacon 150 transmits a tag ID and a tag type. In another embodiment, the beacon 150 transmits multiple sensor data (multiple data from multiple sensors 151, multiple data from one sensor 151), and each packet of sensor data is accompanied by a corresponding tag type for that data. For example, tag type 100 may measure temperature, tag type 101 (FIG. 6) may measure vibration, tag type 102 (FIG. 6) may detect whether a component of a manufacturing system has completed a specific task related to manufacturing (and the completion of that task is detected with an appropriate sensor). The tag type and/or tag ID are then selected. The selection of tag type and/or tag ID may be performed in various ways. In one example, processing engine 106 (FIG. 1) cycles through various tag types and/or tag IDs by cycling through a list of tag types and tag IDs. Cycling may be accomplished through a counter, by cycling through a list of known tag types and/or tag IDs, etc. Alternatively, or in addition, a user may enter a tag type and or a tag ID to be selected. In yet another embodiment, tag type and/or tag ID are selected based on software evaluating other criteria as more fully explained below. If a trigger alert is transmitted, then remedial action may be taken. The remedial action may include one or more steps that includes displaying an alert associated with the fact that the threshold has been crossed, emitting audible tones to indicate that the threshold has been crossed, storing the information in a database, taking corrective action, or performing further analysis such as determining whether the threshold should be modified.

In the above embodiments, a statistical analysis may be performed to determine whether a threshold has been crossed. In an alternative embodiment, more than one type of statistical analysis is performed. If both types of statistical analyses agree that further action is desirable, then processing proceeds and the trigger alert is transmitted. In either case, statistical analysis may be used to determine whether data received from a sensor is an "outlier" as further explained below. In one embodiment, an "outlier" will be ignored if the "outlier" is insignificant to system operation. In another embodiment, the "outlier" is identified so that some type of intervention can take place—resulting in the "outlier" no longer being an "outlier." In other words, the circumstances that resulted in the asset being an "outlier" have been resolved and the asset is either within normal operating boundaries (threshold(s) have not been crossed) or the asset has transitioned to a state where it is closer to (or has reached) normal operating boundaries.

Statistical analyses are well known in the art. Exemplary statistical analyses include local outlier factor and isolation forest. Statistical analyses are described, for example, in Aggarwal, C., et al, Outlier Ensembles—An Introduction, Springer International Publishing, 2017, which is hereby incorporated by reference in its entirety.

In one embodiment, each beacon transmits a data packet that includes a tag ID followed by data associated with that beacon. Beacons may be programmed to transmit data packets at the same time or at respectively different times. Beacons may transmit beacon data packets on the same frequency or on different frequencies. Beacons may transmit beacon data packets over a shared network or on separated networks. One or more detectors acquire beacon data packets and transfer the acquired beacon data packets for further processing. Detectors 160 (FIG. 1) may acquire beacon data packets in parallel or may use filtering mechanisms so that filtering is used to acquire packets from different beacons at different times. Other forms of packet acquisition may also be used as would be understood to one of ordinary skill in the art.

In an exemplary embodiment of the present invention, various indexing schemes are used to acquire data from each beacon 150 (FIG. 1). In one embodiment a counter is utilized, with each counter value corresponding to a respective beacon tag ID. In this manner, one or more detectors 160 (FIG. 1) are continuously acquiring packets of data from beacons 150 and the packets of data are transferred to processing engine 106. Processing engine 106 (FIG. 1) may be "looking for" a beacon 150 with a certain tag ID and then process a packet when the tag ID being sought is received. In another embodiment, packets are acquired and aggregated according to respective tag ID. When a predetermined number of packets with a respective tag ID has been acquired, or packets with a respective tag ID have been acquired over a predetermined amount of time, the acquired packets are processed further as a group. Alternatively, one or more packets are processed as they are received. Predetermined numbers of packets and/or predetermined amount of time to acquire packets may vary. As explained, above, signals received from beacons 150 may be used to determine beacon locations. Any type of data that conveys location may be acquired and/or referred to and/or displayed. Other exemplary forms of location data include relative distance from a fixed object, Compass coordinates, GPS coordinates, presence at a named location, presence on an x-y grid that is customized for a specific location, etc.

The above example sequences through beacons on the basis of a counter. This is exemplary as beacons 150 (FIG. 1) may be sequenced through by other means including a beacon number sequence list.

Figure 5:
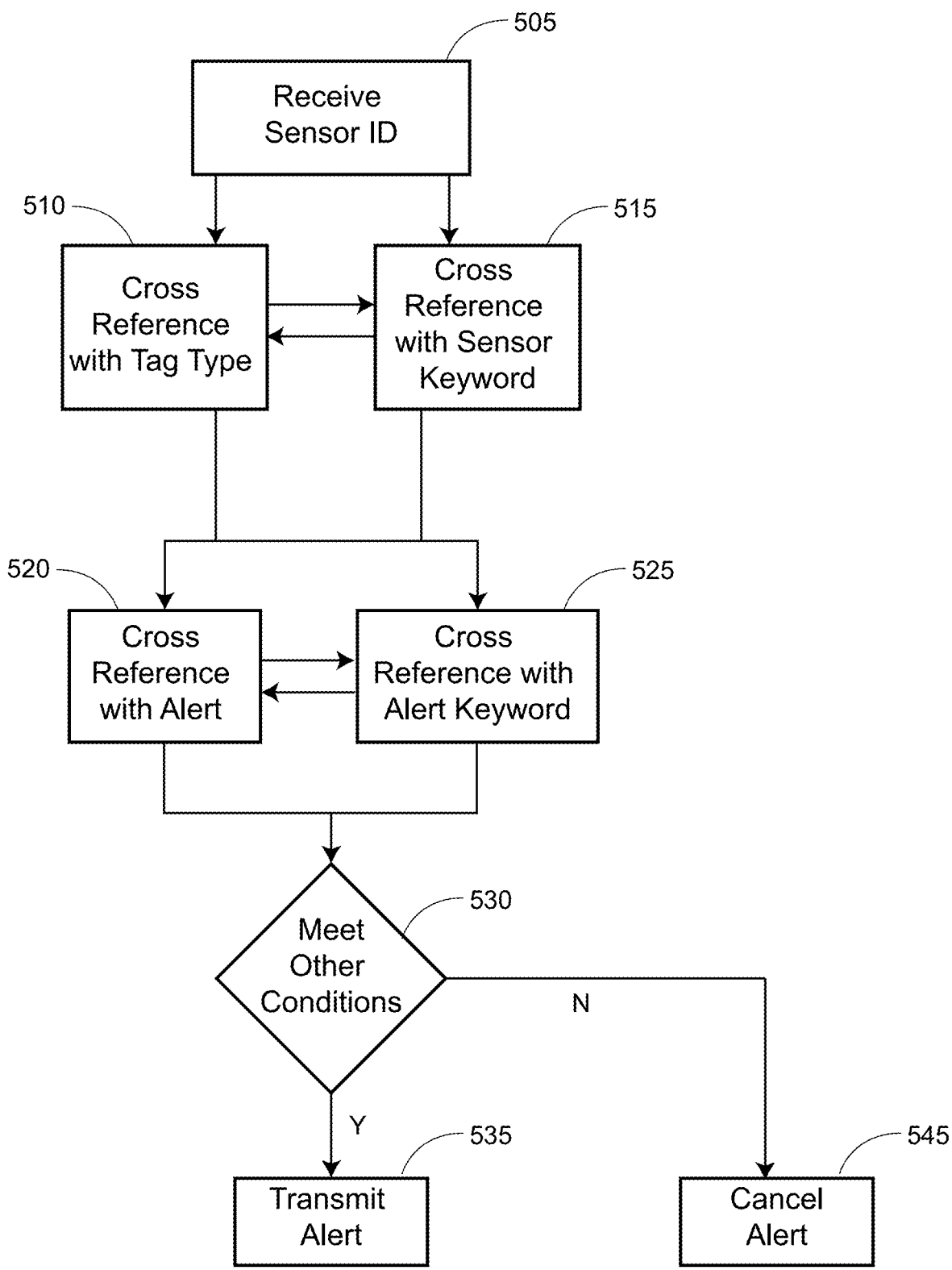
FIG. 5 is a flow chart diagram that illustrates further steps related to transmission of a trigger alert according to an exemplary embodiment of the present invention.

FIG. 5 is a flow chart diagram that illustrates the use of keywords to create trigger alerts according to a further exemplary embodiment of the present invention. Keywords may be associated with a trigger alert, with an asset, with a sensor 151 (FIG. 1) and/or with a beacon 150 (FIG. 1). At step 505, beacon 150 (FIG. 1) transmits sensor data that includes the tag ID associated with the respective sensor 151, which is received by detector 160 and forwarded to acquisition module 104 (FIG. 1). At step 510, processing engine 106 (FIG. 1) cross-references the received tag ID with its respective tag type stored in trigger data database 108. In addition or alternatively at step 515, processing engine 106 cross-references the received tag ID with respective sensor keywords stored in trigger data database 108. At step 520, processing engine 106 cross-references the received tag ID, cross referenced tag type, or crossed referenced sensor keyword with a respective trigger alert. In addition to or alternatively at step 525, processing engine 106 cross-references the received tag ID, cross referenced tag type, or crossed referenced sensor keyword with a respective trigger alert keyword. At step 530, processing engine 106 evaluates other conditions to determine whether those other conditions are met (e.g. other conditions, which if met, would indicate that the cause of a potential trigger alert have not been resolved). If at step 530, processing engine 106 determines those other conditions are met (e.g., the cause of the trigger alert has not resolved), then at step 535, processing engine 106 causes end terminal transceiver 110 (FIG. 1) to transmit a trigger alert with the associated keyword (sensor and/or alert) to end terminal 112 (FIG. 1). However, if at step 530, processing engine 106 determines those other conditions are not met (e.g., the cause of the potential trigger alert has resolved or has resolved in a manner specified when the trigger alert is created), then at step 545, the trigger alert is cancelled by processing engine 106.

FIG. 6 is a diagram of an exemplary data structure for storing exemplary tag ID table 600. Table 600 presents data organized in a logical data structure. Tag ID table 600 includes various fields that are used for interpreting beacon data. Column 602 is a database field for storing tag IDs. In the example, tag IDs are numbered sequentially but this is merely exemplary. Tag ID table 600 includes columns 604 and 606 representing exemplary fields that optionally store location data associated with each tag ID. Location data can be expressed in numerous forms, including x/y coordinates, GPS location, proximity to one or more reference points, generalized location within a predefined area, etc. Column 608 is an exemplary database field that enables storage of tag type associated with each tag ID. In an exemplary embodiment, tag type can be modified, either by software or by a human user. Tag type can take on numerous meanings, including the type of data being measured (temperature, vibration, completion of a task, etc.), physical location, which task each tag is associated with, etc. Columns 610 and 612 are exemplary fields for storing values that are transmitted by each respective tag ID. In one embodiment, a beacon 150 (FIG. 1) may not transmit any such values, and is merely used in order to identify location of an associated sensor 151 (FIG. 1). In another embodiment only one value is used. In other embodiments, multiple values (e.g. 2 or more) are acquired from each beacon 150 (FIG. 1). As an example, if sensor 151 measures temperature, then the value transmitted (and stored in the field of column 610) may be temperature. If sensor 151 measures task completion, the value transmitted can be a "0" for an incomplete task and a "1" for a complete task.

FIG. 7 illustrates exemplary beacon type table 700. Column 702 provides a field for storage of various beacon tag types. Tag types may be assigned numerically or in some other manner. In the example shown, beacon type table 700 associates a lower limit field of column 704 and an upper limit field of column 706 with each tag type. Lower limit field of column 704 includes a lower limit associated with each tag type while upper limit field of column 706 includes an upper limit associated with each tag type. In each example, if the data associated with each tag type crosses the lower and/or upper limit, then an alarm is triggered and further actions occur. As shown in the example, some beacon types (e.g. beacon type 102) do not include a lower or upper limit.

Figure 8:
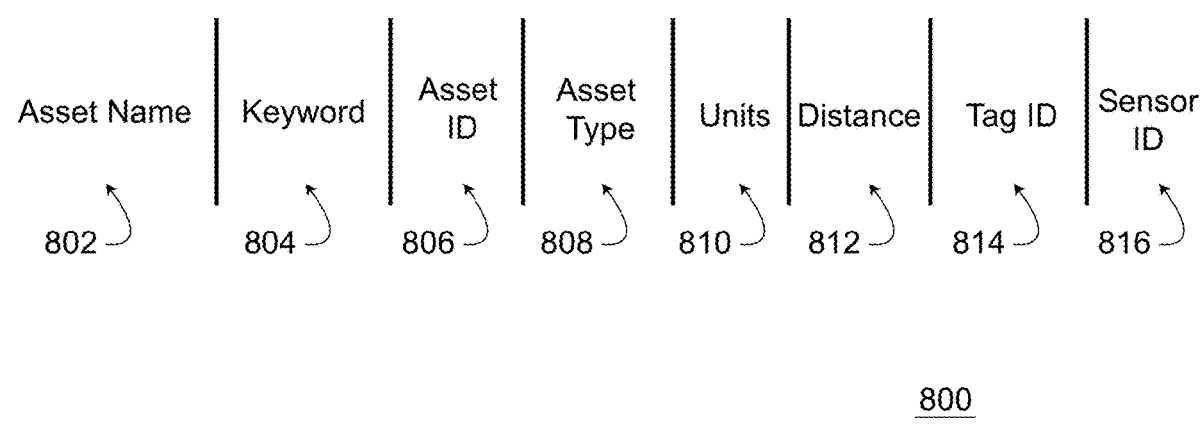
FIG. 8 illustrates a further table for storing data associated with beacons according to an exemplary embodiment of the present invention.

FIG. 8 illustrates an exemplary data structure that is used to determine when a trigger alert is to be transmitted. In particular, the exemplary data structure is used for tracking assets. The exemplary data structure may be referred to as asset table 800. While various fields are shown, these fields are exemplary as some fields may be omitted and other fields may be added. Asset name 802 is used to designate a referenceable name for each asset. Asset names may be descriptive (Room 214 heater) or non-descriptive (AX13479). Whether or not a non-descriptive asset name is used, an optional English language descriptor field may be added for convenience to facilitate identification of an asset. Keyword 804 is one or more keywords associated with an asset. The keyword may be generic (heaters, AC, humidifier, "room temperatures") or the keywords may be specific (Room132Heat, WaterValve). AssetID is a unique identifier associated with each asset. In some embodiments beacon 150 (FIG. 1) transmits the AssetID of the asset associated with beacon 150. In another embodiment for improved detail, beacon 150 transmits both AssetID for an associated asset and a beacon ID (BeaconID) associated with beacon 150. Asset type 808 stores the type of asset (example, heater, AC, water valve, gas valve, etc.). Units 810 stores the units by which behavior of an asset if measured (degrees C. for heater, gallons per minute for a water valve, sine wave cycles for vibration detection, etc.). Distance 812 may be used to store location of an asset. As stated above, distance can be absolute or relative. X/Y coordinates, GPS, and proximity towards or away from a target are all examples of location. Tag ID 814 is a unique identification number of beacon 150 associated with an asset. Sensor ID 816 is a unique identification number of sensor 151 associated with an asset. Tag ID 814 and sensor ID 816 may be useful, for example, when multiple beacons are associated with an asset, multiple sensors are associated with an asset, multiple assets are associated with a beacon or sensor, etc.

FIG. 8 is directed towards assets, but the table shown in FIG. 8 or a table similar to the table shown in FIG. 8 may be used for storing information relating to sensors 151 (FIG. 1) and/or beacons (FIG. 1). Such tables may be cross referenced relative to each other for associated assets, sensors 151 and beacons 150. Further information can also be added to a similar table which can be used to understand where assets (or sensors 151, or beacons 150) are located, or should be located, or should not be located, or are intended to be located, or information about their function. The information may be broadly stated ("identify temperature on the second floor") or narrowly stated ("identify temperature of heating unit 257 located in room 123").

Figure 9:
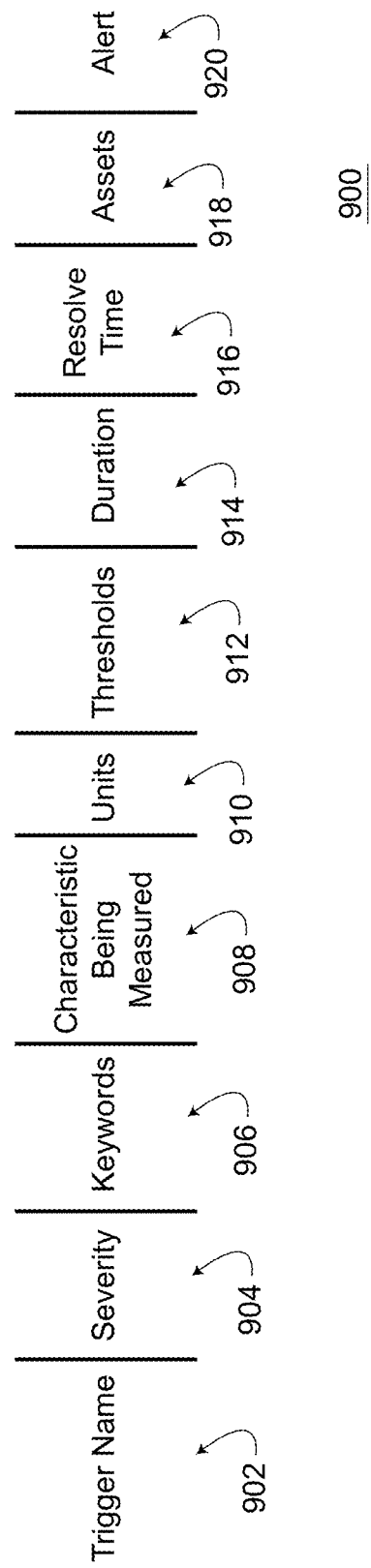
FIG. 9 illustrates a further table for creating trigger alerts according to an exemplary embodiment of the present invention.

FIG. 9 illustrates a further exemplary data structure according to an exemplary embodiment of the present invention. This exemplary data structure enables trigger alerts to be created. As further explained below, this exemplary data structure may be used in combination with the user interface illustrated in FIG. 11.

Returning to FIG. 9, exemplary data structure trigger table 900 is illustrated. Trigger table 900 includes a plurality of fields 902, 904, 906 . . . 920 that are described below. In some embodiments one or more of the illustrated fields may be omitted and in other embodiments additional fields may be added. Trigger name 902 provides for storage of a name associated with a trigger alert. The name may be descriptive or non-descriptive. A separate field (not shown) may be included to store whether or not a non-descriptive asset name is used. An optional English language descriptor field may be added for convenience to facilitate identification of a trigger alert. Severity 904 may be used to store a severity modifier for the trigger alert. Examples: Moderate: transmit trigger alert when threshold exceeded. Significant: transmit trigger alert when threshold exceeded by 10%. Severe: transmit trigger alert when threshold exceeded by 20%. Keyword 906 is one or more keywords associated with an asset. Keywords 906 are for storing keywords associated with a trigger alert. The keywords may be generic (OverHeat, Cardiac, Water, Leak) or the keywords may be specific (Room132, Floor7, Overheat). CharacteristicBeingMeasured 908 is the physical or status related characteristic being measured. Examples include temperature, pressure, process complete, process partially complete). Units 910 are actual units (degrees C., degrees F., process 3/7 complete). Thresholds are the thresholds that when crossed result in a trigger alert being transmitted. Examples: Above 90 C, below 20 F, subprocess 3 running for more than X minutes and subprocess 3 is not complete, vibration above 200 Hz, door open. Duration 914 is the total amount of time a threshold remains crossed before a trigger alert is transmitted. Resolve time 916 is a time period within which if a sensor signal transitions from crossing a threshold to not crossing that threshold then the trigger alert is marked as "resolved" (and a message is transmitted for example to an end terminal to that effect). Assets 918 are the assets associated with a trigger alert. Alert 920 is addressing information for the end terminals to which alerts are transmitted.

Figure 10:
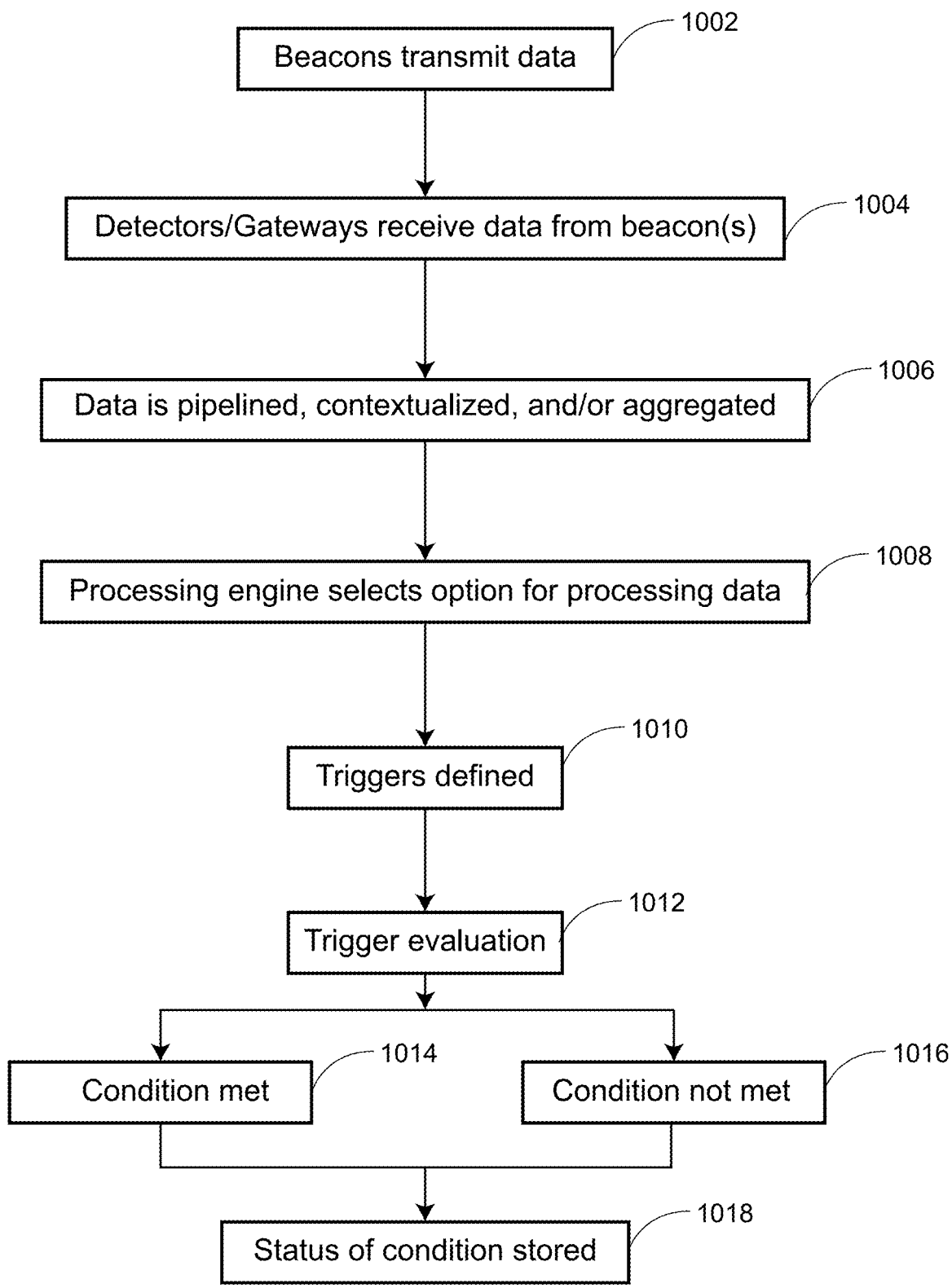
FIG. 10 is a flow chart that illustrates how sensor data is processed according to an exemplary embodiment of the present invention.

FIG. 10 is a flowchart that illustrates a further exemplary embodiment of the present invention. Portions of the description that follows may supplement any of the embodiments set forth above. Portions of the descriptions set forth above may supplement the exemplary embodiment illustrated in FIG. 10. Portions of one embodiment described above may supplement portions of another embodiment described above.

At step 1002, a plurality of beacons 150 (FIG. 1) transmit data. Each beacon 150 may or may not acquire data that is transmitted to detectors 160 (FIG. 1) (gateways). A signal transmitted by a beacon 150 may or may not be used to identify the location of the beacon 150. Examples of the type of data transmitted by a beacon are numerous:

A beacon may receive and retransmit data from a temperature sensor that is monitoring a step of a manufacturing process.

A beacon may receive and retransmit data from a temperature sensor that is monitoring temperature in a health facility such as a hospital patient room or an operating room.

A beacon may receive and retransmit data from a vibration sensor that is monitoring a step of a manufacturing process.

A beacon may receive and retransmit data from a pressure sensor that is monitoring a step of a manufacturing process.

A beacon may be attached to another object (tool, bed, person, equipment, machinery, etc.) and may transmit a signal that is used to identify the location of the object to which the beacon is attached.

Each beacon may transmit a digital signature that is unique to each beacon and that is used to identify each beacon.

At step 1004, various gateways 160 (FIG. 1) receive signals from one or more beacons 150 (FIG. 1). The signals may be received via various communication technologies that are known to one of ordinary skill in the art. Exemplary communication technologies include wi-fi, Bluetooth, cellular, RF, satellite, etc. In some embodiments, a signal from each beacon is received by one or more gateways. Factors that affect how many beacons receive a signal include proximity, signal strength, modulation technology, analog filtering, digital filtering, etc.

In one embodiment, a signal that is received by multiple gateways 160 (FIG. 1) may be triangulated to identify the location of the beacon that transmitted the message that is received by the gateways 160. In further embodiments, other well-known forms of location identification may be used, such as trilateration (determining location using geometry of spheres, circles, or triangles) or multilateration (determining location using multiple ranges between a point and multiple spatially-separated know locations. Other technologies for location identification (including scanning codes such as bar codes or QR codes) may also be used.

Data thus is received by gateways 160 (FIG. 1) and is subsequently pipelined, contextualized and/or aggregated at step 1006 by acquisition module 104, processing engine 106 or both (FIG. 1). As described earlier, pipelining is the process of managing data that has been received at any time (sequentially or in parallel), and organizing the data in a manner so that it can be acted on by one or more processors (included for example in processing engine 106). This may include organizing the data in a pipeline (serially and/or in parallel) manner and allowing a processor to process the data in a pipeline manner. This process may also include recognizing when identical data has been received by multiple gateways and deleting redundant data. This process may also include performing analysis to identify the location of a beacon 150 (FIG. 1) and associating that location data with acquired sensor data (as opposed to multiple sensor data values acquired simultaneously from multiple beacons 150). Contextualizing means taking data from a beacon and determining what the beacon 150 is attached to. An example would be to receive data from a beacon 150 with a unique signature (assume Beacon with tag ID 12345), and looking up what that beacon 150 is attached to so that the received sensor data can be processed correctly. In some embodiments, when sensor data is initially received from a beacon 150 it may be unknown what asset or sensor the beacon is attached to (and this information needs to be looked up). For example, the beacon may be attached to a temperature sensor (and maybe it is attached to a freezer, an operating room, etc.). Another example is vibration data is received, and contextualizing enables an identification of the machine for which vibration is being measured. Exactly what machine is attached to a beacon may play an important role moving down the flowchart because what the beacon is attached to may (or may not) affect how the data received from the beacon is analyzed. For this purpose, a table may be used to cross reference between beacon signatures and what each beacon is doing in terms of one or more factors such as location, type of sensor, type of device or environment being sensed, actual purpose of the machine/tool for which data is being sensed, etc. (see for example FIG. 8). If, for example, a beacon is associated with an operating room, then decisions can be made based on the fact that the beacon is supplying data associated with an operating room.

Aggregations can depend on each beacon type and what each beacon type is attached to. In one example, a beacon transmits a status of 0 or 1. In one example, 0 means a beacon is off and 1 indicates that a beacon is not off. Or, 0 means that a device associated with a beacon is off and 1 indicates that a device associated with a beacon is not off. An example of aggregating is to sample a beacon output multiple times over 30 seconds to determine if the beacon was ever on during that 30 second interval. Therefore, beacon output can be monitored over a period of time to contextualize the output of such a (status) beacon. Another example would be to contextualize output of a temperature beacon and to measure temperature output in C or F. As another example, if data is highly variable, the aggregation period may desirably be longer, or if variability is detected, then the aggregation period can be lengthened. Another example is battery status that may only be collected one time per day. With another value such as temperature, a temperature reading may be taken (for example) three times a second over 30 seconds, eliminating outliers, averaging the remainder, and storing the average in a database of further processing. Outlier removal is known in the art. Examples include the use of interquartile range, winsorization, cutting off three standard deviations from the mean, etc.

Aggregation can also occur from multiple beacons at once. Assume multiple beacons attached to one asset (tool, machine, room, facility, etc.), and the multiple beacons provide information regarding the health of a particular asset.

Aggregation can also occur when data from one beacon is received over multiple gateways.

Aggregation is performed in a series of exemplary steps. First, should aggregation occur? Second, is there enough data in a pipeline to perform aggregation or should aggregation wait until more data is present in the pipeline? Third, has data been acquired over a sufficient amount of time so that aggregation may occur? If the answer to any of the above questions is "yes" then aggregation may occur.

At step 1008, processing engine 106 (FIG. 1) can select from a plurality of various available options for processing the data collected at step 1006.

According to the present invention, triggers may be defined at step 1010. Triggers may be defined based on filter definitions. An example of a trigger is "I want to create a trigger for ALL operating rooms." In the example, contextualizing includes the step of determining if a beacon 150 (FIG. 1) is attached to an operating room. If it is, then all the beacons 150 attached to operating rooms are used to execute a trigger evaluation—the process that decides the condition of a beacon asset according to a specific trigger. Exemplary triggers include temperature, humidity, leak detection, vibration, etc. A trigger can be anything that is a numerical value that can be returned by a beacon 150.

At step 1012, when processing engine 106 (FIG. 1) determines a value returned by a beacon within an aggregation crosses a threshold value (see FIG. 7) then a trigger alert is generated by processing engine 106 and the trigger alert is subsequently transmitted by end terminal transceiver 110 (FIG. 1) to end terminal 112 (FIG. 1). Alert transmission may include an audible sound, a visual affect (e.g. a warning light or a message on a computer screen or phone, etc.), and/or simply storing the alert in a database for future retrieval and/or analysis. Alternatively, or in addition, an alert can be based on location (e.g. an asset moves or moves out of a permissible zone, or moves into an impermissible zone). Another alert may be when an asset moves too far, for example moves 20 feet when only 10 feet of movement is permitted. Or, the asset moves an impermissible distance within a specified period of time. Another example would be when an asset moves too close to a location. An example would be an asset with possible peanut contamination getting too close to a peanut allergy location.

Step 1012 thus refers to trigger evaluation, namely determining whether one or more returned beacon values triggers an alert by crossing a threshold. If a threshold has been crossed, then this may be referred to as "condition met." If a threshold has not been crossed, then this may be referred to as "condition not met." The status of whether a condition has been met is stored at step 1018. In some examples, a condition may be "met," but subsequently a condition may be "not met." Depending on the circumstances in which a condition might be met or not met, an alert may or may not be transmitted.

In an exemplary embodiment of the present invention, there are various ways to classify alert status if "condition met" has occurred (step 1014) or if "condition not met" has occurred (step 1016). These classifications can be stored in a database (e.g., trigger data database 108 of FIG. 1) and/or transmitted to an end user (e.g., of end terminal 112). Examples follow:

None—No threshold have been crossed, or no thresholds have been crossed within a time period, or thresholds have been crossed an insignificant number of times ("insignificant" may be defined), or threshold have been crossed an insignificant number of times (e.g. not enough times to result in the transmission of a trigger alert) in a time period, or one or more events have (or have not) occurred and therefore the beacon (or more specifically, whatever status is being monitored by a sensor associated with a beacon) is in a "good" state. A good state refers to the fact that the beacon is within a range it is supposed to be in (has not crossed a threshold), and there are no problems associated with the data being acquired by the sensor associated with the beacon. Alternatively, if a particular beacon transmits status (0=processing proceeding correctly; 1=processing not proceeding correctly), then the beacon transmitting "0" means the asset it is associated with is in a good state. To be more specific, the beacon is transmitting sensor data acquired by a sensor (or a lack of transmission from a sensor or beacon may indicate that data being received from the associated sensor is within acceptable thresholds), and the data (and/or data from multiple beacons) has not crossed one or more thresholds. Another way to express a lack of a threshold being crossed (or lack of a threshold being crossed in certain conditions) is that the acquired data value is "in bounds." In such a situation, no alerts are transmitted (or a status indication that an evaluated condition is "OK" is continually transmitted).

Met+not met duration—a beacon has transmitted data that indicates a threshold has been crossed (at least once), the beacon is being monitored over one or more periods of time (i.e. a single crossing of a threshold may or may not indicate that an alert has been transmitted), and the period of time has not yet elapsed to determine whether detection of an adverse event (e.g. crossing a threshold) indicates that an alert should be transmitted. An example would be the beacon transmits acquired temperature data every second, the data is monitored for 30 second intervals, adverse temperature data (a threshold has been crossed) is acquired once, and the 30 second interval has not completed. The 30 second interval can begin at any time. In one embodiment, when one 30 second interval finishes the next 30 second interval begins. In another embodiment, the 30 second interval begins when acquired sensor data crosses a threshold (or first crossed a threshold within a time period).

Met+met duration—a beacon has transmitted sensor data that indicates a threshold has been crossed (at least once), a period of time has elapsed, and the threshold has been (or remains) crossed a sufficient amount of times within the elapsed time period to indicate that an alert should be transmitted. As in the examples above, the 30 second interval can begin at multiple times, including the first time acquired sensor data crosses a threshold (or first crossed a threshold within a time period).

Resolving+not resolve duration—a threshold has been crossed, data is acquired indicating that the attribute being measured is outside of acceptable bounds, the threshold is no longer crossed (or the sensor data indicates that the sensor data is heading in the direction of no longer crossing the threshold), but a predetermined period for evaluating whether the threshold is still crossed has not completed. In one example, the attribute being measured is moving back towards a value that does not cross a threshold. In another example, the attribute being measured has moved back to a value that does not cross a threshold. With this status, the out of bounds event is being monitored to determine if the out-of-bounds event resolves within a predetermined time period, but the predetermined time period has not yet completed.

Resolving+resolve duration—a threshold has been crossed, and the out-of-bounds event has resolved within a predetermined time period.

FIG. 11 illustrates an exemplary user/administrator interface 1061 of the processing engine 106 (FIG. 1) for triggering alerts. The user interface 1061 includes various fields that may be modified in order to modify the manner in which trigger alerts are created and/or triggered. This user interface 1061 allows an alert to be defined so that technical advantages are achieved. In particular, a monitored environment (e.g., environment 102 of FIG. 1) can be a manufacturing facility, a health care facility, a large building, or other environments. Such environments may have a large number of sensors that are monitoring multiple locations, multiple types of data, or both. When an environment with a large number of sensors is being monitored, it can be extremely challenging to determine if one or more sensors are indicating a condition that requires intervention. Therefore, according to exemplary embodiments of the present invention, a plurality of databases are provided that enables sensors (via their associated beacons) to be monitored. Without these databases, each sensor output would need to be sequentially reviewed to determine if an adverse condition exists. Thus, the present invention provides a technical improvement by allowing sensor output to be monitored in an ordered manner.

As stated above, exemplary user interface 1061 allows a trigger alert to be created for a plurality of various conditions. Name field 1102 allows a name to be assigned to a trigger alert. Name field 1102 corresponds to trigger name 902. Description field 1104 allows an English language description to be entered; the English language description is associated with the named trigger alert identified via name field 1102. Severity field 1106 provides a simple way to define when data from a sensor (or from multiple sensors) will produce a trigger alert. Examples: "mild"—threshold surpassed; "moderate"—threshold surpassed by 10%; "severe"—threshold surpassed by 20%. Severity field 1106 corresponds to severity 904. Add Keywords field 1108 allows keywords to be associated with a defined trigger alert. If for example the keyword "refrigerator" is added to a trigger alert, then a search under that keyword will result in accessing that trigger alert. Add keywords 1108 corresponds to keyword 906. Trigger Type 1110 allows a trigger alert to be created for a specific type of measurement. Examples: "temperature", "pressure", "light", "distance." Condition field 1112 allows the units of a trigger alert to be defined. Examples: temperature, humidity, distance, proximity, vibration. Falls Below 1112a allows a threshold to be defined, and an alert to be triggered if sensor data drops below the threshold. Rises Above 1112b allows a threshold to be defined, and an alert to be triggered if the sensor data goes above the threshold. Duration field 1114 specifies the amount of time a threshold is exceeded before a trigger alert is transmitted. Auto resolve field 1116 is the amount of time after a threshold has been crossed that sensor data is permitted to cross back over the threshold (to what may be considered an "in range" data value) to transmit that a trigger alert has been resolved. Asset filter 1118 are the assets associated with a trigger alert. Asset filter 1118 corresponds to Assets 918. Contacts 1120 is the contact information for the end terminal that is to receive a trigger alert if a trigger alert is transmitted. The subscriptions field 1122 allows an alert to be added to alert subscriptions. For example, an alert subscription may be all the trigger alerts that are transmitted to an end terminal. A subscription may be preexisting (an end terminal may be subscribed to multiple trigger alerts), and a trigger alert may be added to that preexisting subscription.

Figure 12:
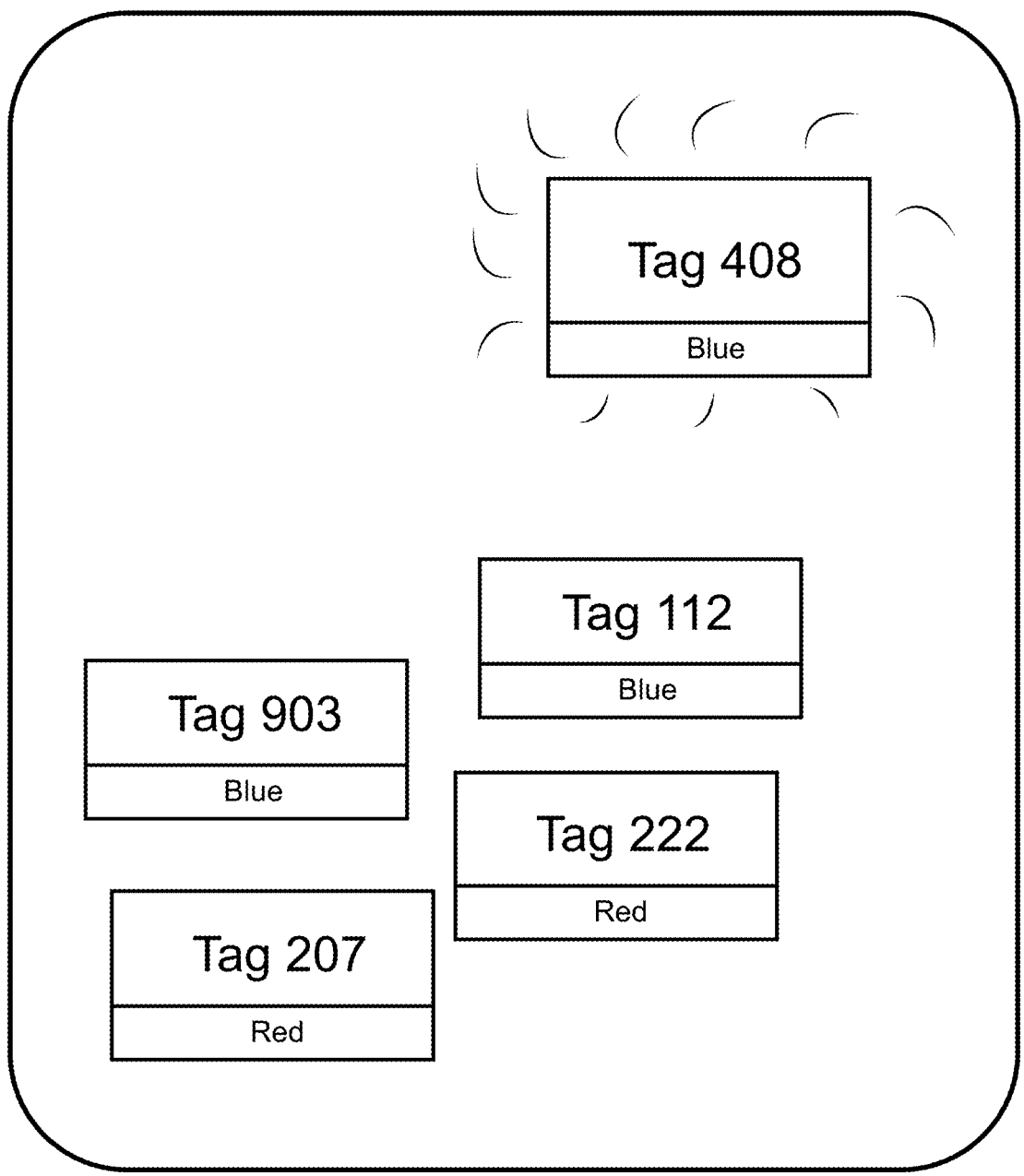
FIG. 12 illustrates providing information related to sensors and for communicating trigger alerts according to an exemplary embodiment of the present invention.

FIG. 12 schematically illustrates transmitting a trigger alert according to an exemplary embodiment of the present invention. In the present embodiment, the locations of various assets or sensors/beacons are illustrated on an I/O device. In this example, "Tag" with various numbers are shown on a display screen to represent various assets or sensors/beacons in close proximity to each other. Each asset or sensor/beacon may be identified more descriptively for ease of identification. Optional information may also be displayed with each asset or sensor. In the example, a color scheme is used to identify type of asset, type of sensor, whether an asset or a sensor is depicted, etc. Note that Tag 408 is separated from the other assets/sensors a sufficient distance that a trigger alert has been transmitted for Tag 408. In the example, the alert is in the form of Tag 408 being visually different than the other tags (Tag 408 is depicted as being brighter, pulsing, having unique display properties, etc.). The exemplary display can be continually updated as trigger alerts are transmitted and subsequently resolved (by being resolved within a resolving time period, by being manually repaired, etc.).

The present invention thus achieves numerous technical improvements over the prior art. For example, if an alert is tagged with the keyword "refrigerator," then entering the keyword refrigerator enables a trigger alert to be provided to designated individuals if a sensor measuring refrigerator temperature measures a temperature that crosses a specified threshold ("too low" if the refrigerator gets too cold, "too hot" if the refrigerator gets too hot). In this manner, a designated individual is informed if a refrigerator is malfunctioning. In an exemplary embodiment of the present invention, this functionality provides the technical improvement of assigning an individual who will intervene when one of multiple refrigerators malfunctions. Without this functionality, the refrigerator sensor would transmit a temperature, the transmitted temperature would need to be evaluated to determine whether the temperature is indicative of a problem, then a determination would need to be made as to who needs to receive the report of the problem so that the recipient can initiate intervention to correct the problem. Such a manual approach includes multiple inefficiencies, it unacceptably time consuming, is prone to errors, and is not dynamic in its ability to easily modified. By creating multiple databases that are populated and accessed (for example with the user interface 1060, an adverse condition is readily identified and reported promptly to the correct person. Alternatively, multiple assets (with respective associated sensors) may be responsible for providing a certain results (e.g. a certain environmental condition) and a trigger alert can be created and transmitted if any of the sensors associated with those assets cross a threshold. Furthermore, the dynamic nature of the system allows the technical improvement of a definition of an adverse condition to be readily modified as it is learned through experience when intervention is or is not desirable. Also, the person who will intervene when an adverse condition occurs can be readily changed (by changing or modifying the designated end terminal in alert 920). In addition, individuals are able to search using keywords to find relevant sensors and to be able to efficiently review the data provided by sensors based on entered keywords. Such dynamic operation is not readily achievable when sensors are checked manually. Therefore, various technical improvements are achieved as a result of the exemplary embodiments described herein.

In another exemplary embodiment of the present invention, the sensor that produces sensor data that is an "outlier", or that is more of an "outlier" than other sensors that produce sensor data, is identified. In this manner, if multiple sensors are producing data that are fairly consistent with each other, but one sensor is producing data that is different than the sensor data produced by the other sensors, the asset associated with the sensor with the different sensor data is desirably intervened with (and/or ignored). In this manner, the sensor associated with the asset intervened with will then produce sensor data consistent with other sensors. Assume that the sensor data of temperature sensors is being evaluated. Temperature sensors may have a tag type associated with temperature sensors. The temperature of assets associated with temperature sensors is acquired. The data is determined to be temperature data because the tag ID of various sensors is received, those tag IDs are filtered to yield the tag IDs of sensors associated with temperature data. The temperature data from those sensors is statistically analyzed to determine if one of those sensors is an "outlier." The asset associated with the outlier sensor is then assumed to be defective, or require replacement, repair, or adjustment, or be ignored. That asset receives (human or machine) intervention as needed (repair, replacement or adjustment) so that the sensor associated with that asset no longer provides data indicating that the sensor is an "outlier." When the sensor is identified, the location of the sensor/asset may also be identified as set forth above. In this manner an asset that requires intervention receives that intervention to address the issue that caused its associated sensor to present itself as an "outlier."

In an exemplary embodiment of the present invention a computer system may be included and/or operated within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system includes a processing device, a main memory (e.g., read-only memory (ROM), flash memory, dynamic random access memory (DRAM) (such as synchronous DRAM (SDRAM) or Rambus DRAM (RDRAM), etc.), a static memory (e.g., flash memory, static random access memory (SRAM), etc.), and a data storage device, which communicate with each other via a bus.

Processing device represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device may also be one or more special-purpose processing devices such as an application specific integrated circuit (ASIC), a field programmable gate array (FPGA), a digital signal processor (DSP), network processor, or the like. Processing device is configured to execute listings manager logic for performing the operations and steps discussed herein.

Computer system may further include a network interface device. Computer system also may include a video display unit (e.g., a liquid crystal display (LCD) or a cathode ray tube (CRT)), an alphanumeric input device (e.g., a keyboard), a cursor control device (e.g., a mouse), and a signal generation device (e.g., a speaker).

Data storage device may include a machine-readable storage medium (or more specifically a computer-readable storage medium) having one or more sets of instructions (e.g., reference generation module) embodying any one or more of the methodologies of functions described herein. The reference generation module may also reside, completely or at least partially, within main memory and/or within processing device during execution thereof by computer system; main memory and processing device also constituting machine-readable storage media. The reference generation module may further be transmitted or received over a network via network interface device.

Machine-readable storage medium may also be used to store the device queue manager logic persistently. While a non-transitory machine-readable storage medium is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instruction for execution by the machine and that causes the machine to perform any one or more of the methodologies of the present invention. The term "machine-readable storage medium" shall accordingly be taken to include, but not be limited to, solid-state memories, and optical and magnetic media.

The components and other features described herein can be implemented as discrete hardware components or integrated in the functionality of hardware components such as ASICs, FPGAs, DSPs or similar devices. In addition, these components can be implemented as firmware or functional circuitry within hardware devices. Further, these components can be implemented in any combination of hardware devices and software components.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

Various exemplary embodiments are described above. It is understood that exemplary embodiments (or portions thereof) described above may be combined without limitation to yield further exemplary embodiments of the present invention.

The above examples include transmitting data from a first device to a second device (such as between a user terminal and a server). It is understood that the first and/or second device may be receiving data from respective servers, and it is contemplated that transmitting data may be accomplished by transmitting data to/from one or more of the respective servers.

In the aforementioned description, numerous details are set forth. It will be apparent, however, to one skilled in the art, that the disclosure may be practiced without these specific details. In some instances, well-known structures and devices are shown in block diagram form, rather than in detail, in order to avoid obscuring the disclosure.

The disclosure is related to an apparatus for performing the operations herein. This apparatus may be specially constructed for the required purposes or it may comprise a general purpose computing device selectively activated or reconfigured by a computer program stored therein. Such a computer program may be stored in a non-transitory computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory devices including universal serial bus (USB) storage devices (e.g., USB key devices) or any type of media suitable for storing electronic instructions, each of which may be coupled to a computer system bus.

Whereas many alterations and modifications of the disclosure will no doubt become apparent to a person of ordinary skill in the art after having read the foregoing description, it is to be understood that any particular implementation shown and described by way of illustration is in no way intended to be considered limiting.

Therefore, references to details of various implementations are not intended to limit the scope of the claims, which in themselves recite only those features regarded as the disclosure.

ITEM NUMBERS 102 environment
150 beacon
151 sensor
104 acquisition module
106 processing engine
108 trigger data database
110 end terminal transceiver
112 end terminal
600 tag ID table
602 tab ID
604 x-coord
606 y-coord
608 tag type
610 value 1
612 value 2
700 tab type table
702 tag type
704 lower limit
706 upper limit
800 asset table
802 asset name
804 keyword
806 asset ID
808 asset type
810 units
812 distance
900 trigger table
902 trigger name
904 severity
906 keywords
908 characteristic being measured
910 units
912 thresholds
914 duration
916 resolve time
918 assets
920 alert

What is claimed is:

1. A data acquisition management system, comprising:
a plurality of sensors, each of the sensors for acquiring sensor data based on respective physical or logical conditions;
a plurality of beacons, each of the beacons acquiring the sensor data from one or more associated ones of the sensors and broadcasting the sensor data;
a plurality of detectors for receiving the sensor data broadcasted by the beacons, wherein if two or more of the detectors receive a signal from a same one of the beacons then:
1) that beacon will communicate with the one of the two or more detectors that has a strongest signal with that beacon;
2) the communication with that beacon will be determined on a physical proximity of that beacon to the two or more detectors; or
3) a signal strength of the signal received from that beacon by the two or more detectors is triangulated in order to identify the location of that beacon;
an acquisition module in data communication with the plurality of detectors for preprocessing the sensor data received by the plurality of detectors;
a database comprising a trigger data file for storing conditions under which each of a plurality of trigger alerts occurs, wherein each of the trigger alerts includes:
at least one unique identifier of an associated one of the sensors;
at least one threshold of the associated one of the sensors, which when crossed initiates the trigger alert; and
at least one pointer that directly or indirectly references the unique identifier of the associated one of the sensors that provides the sensor data that is used to determine if the trigger alert occurs;
a processing engine comprising at least one processor for analyzing the preprocessed sensor data and determining for each of the sensors if the at least one threshold of the sensor has been crossed; and
a trigger alert transmitter for transmitting to a designated one of a plurality of end terminals the trigger alert associated with the sensor if the at least one threshold of the sensor is crossed.

2. The data acquisition management system according to claim 1, wherein the sensor data from each of the sensors is acquired from respective sensor signals, and the processing engine includes a location processor for determining location or movement of at least one of the sensors based on measurements of at least one of the sensor signals.

3. The data acquisition management system according to claim 2, wherein the measurements include at least one of signal strength measured at multiple ones of the beacons or signal strength measured at multiple times.

4. The data acquisition management system according to claim 1, wherein one or more sensor keywords are associated with each of the sensors, one or more alert keywords are associated with each of the trigger alerts, and one or more the sensor keywords are associated with each of the trigger alerts.

5. The data acquisition management system according to claim 1, wherein a respective duration is associated with each of the trigger alerts, and each of the trigger alerts are initiated when each respective one or more of the thresholds remains crossed for the respective duration.

6. The data acquisition management system according to claim 1, wherein a respective resolve time is associated with each of the trigger alerts, wherein each of the trigger alerts is cancelled by the processing engine if resolved within the respective resolve time.

7. The data acquisition management system according to claim 1, wherein the trigger data file includes address identifiers associated with each designated end terminals, and each of the trigger alerts is transmitted by the trigger alert transmitter to each designated end terminal based on a respective one of the address identifiers to report the trigger alerts.

8. The data acquisition management system according to claim 1, wherein transmitting the trigger alerts to each designated end terminal results in providing the trigger alerts to respective physical terminals, wherein the processing engine allows at least one of:
cancelling one of the trigger alerts responsive to a cancel reply on one of the physical terminals; and
modifying one of the thresholds for one of the trigger alerts responsive to a modify reply that is transmitted from one of physical terminals.

9. The data acquisition management system according to claim 1, wherein the processing engine includes a user interface for adding, modifying or deleting the trigger alerts.

10. The data acquisition management system according to claim 2, wherein the processing engine is capable of delivering at least one of the trigger alerts based on the one or more thresholds being crossed and is also capable of delivering at least another of the trigger alerts based on the location or the movement.

11. The data acquisition management system according to claim 1, wherein multiple occurrences of the sensor data from one or more of the sensors receives evaluation by the processing engine, and one or more of the multiple occurrences that crosses one of the threshold is omitted from causing one of the trigger alerts based on the evaluation.

12. The data acquisition management system according to claim 4, wherein at least one of the designated end terminals receives one or more of the alert keywords for delivering one of the trigger alerts associated with the one or more of the alert keywords to the one of the designated end terminals.

13. The data acquisition management system according to claim 4, wherein at least one of the designated end terminals receives one or more of the sensor keywords for delivering one of the trigger alerts associated with the one or more of the sensor keywords to the one of the designated end terminals.

14. The data acquisition management system according to claim 1, wherein more than one of the sensors providing sensor data that crosses more than one of the threshold results in transmitting one of the trigger alerts.

15. A method for acquiring sensor data and transmitting alerts, comprising:
acquiring, with a plurality of sensors, sensor data based on respective physical or logical conditions;
acquiring, with each one of a plurality of beacons, the sensor data from one or more associated ones of the sensors;
broadcasting, with the beacons, the sensor data;
receiving, with a plurality of detectors, the sensor data broadcasted by the beacons, wherein if two or more of the detectors receive a signal from a same one of the beacons then:
1) That beacon will communicate with the one of the two or more detectors that has a strongest signal with that beacon;
2) The communication with that beacon will be determined on a physical proximity of that beacon to the two or more detectors; or
3) A signal strength of the signal received from that beacon by the two or more detectors is triangulated in order to identify the location of that beacon;
preprocessing, with an acquisition module in data communication with the at least one detector, the sensor data received by the plurality of detectors;
storing, in a trigger data file of a database, conditions under which each of a plurality of trigger alerts occurs, wherein each of the trigger alerts includes:
at least one unique identifier of an associated one of the sensors that acquires the sensor data;
at least one threshold of the associated one of the sensors that acquires the sensor data, which when crossed initiates the trigger alert; and
at least one pointer that directly or indirectly references the unique identifier of the associated one of the sensors that acquires the sensor data, which is used to determine if the trigger alert occurs;
analyzing, with a processing engine comprising at least one processor, the preprocessed sensor data and determining for each of the sensors if the at least one threshold of the sensor has been crossed; and
transmitting, with a trigger alert transmitter, to a designated one of a plurality of end terminals the trigger alert associated with the sensor if the at least one threshold of the sensor is crossed.

* * * * *